United States Patent [19]
Newbould

[11] Patent Number: 5,429,405
[45] Date of Patent: Jul. 4, 1995

[54] VEHICLE CAP

[76] Inventor: Richard J. Newbould, P.O. Box 1146, Hernando, Fla. 34442-1146

[21] Appl. No.: 263,388

[22] Filed: Jun. 22, 1994

[51] Int. Cl.⁶ ................................ B60J 1/20
[52] U.S. Cl. ...................... 296/95.1; 296/166
[58] Field of Search ............ 296/163, 166, 95.1, 296/136, 213, 164; 160/370.2

[56] References Cited

U.S. PATENT DOCUMENTS

| | | | |
|---|---|---|---|
| 2,643,912 | 6/1953 | Lyon | 296/95.1 |
| 2,643,913 | 6/1953 | Lyon | 296/95.1 X |
| 2,783,082 | 2/1957 | Genua | 296/95.1 |
| 3,019,049 | 1/1962 | Barenyi | 296/213 |
| 3,719,383 | 3/1973 | Ferro | 296/166 |
| 4,332,415 | 1/1982 | Williams | 296/213 |
| 5,087,092 | 2/1992 | Antopolsky et al. | 296/95.1 |
| 5,104,177 | 4/1992 | Thomas, Jr. | 296/164 X |
| 5,186,511 | 2/1993 | Hwang | 296/95.1 |

Primary Examiner—Joseph D. Pape

[57] ABSTRACT

A shell-like vehicle cap mounted to the top of a vehicle, wherein there is an opening in the top of the vehicle and an opening in the floor of the cap, allowing entrance to the interior of the cap from the interior of the vehicle. The cap overhangs outwardly beyond the body of the vehicle, protecting the vehicle from sun and rain, and allowing ventilation openings, lights, etc. to be placed in the protected portion of the overhanging area.

2 Claims, 1 Drawing Sheet

VEHICLE CAP

SUMMARY OF THE INVENTION

This invention relates to a vehicle cap which overhangs outwardly beyond the body of the vehicle at the roof line, shading the vehicle, and being configured to prevent rain from following the form of the cap to the body of the vehicle.

Previously, vehicle caps provided little or no sun shade, and allowed rain to follow the contour of the cap, directly to the body of the vehicle.

The vehicle cap of this invention is contoured on its lower side to overhang the body of the vehicle at the roof line and provide a means of causing water to drip from the cap rather than allowing it to flow to the vehicle body.

Accordingly it is an object of the present invention to provide an improved cap to be fastened to the top of a vehicle.

It is another object of the present invention to provide a vehicle with a cap which discourages rainwater from flowing to the body of the vehicle.

Other objects, features and advantages of the present invention will become apparent upon reading the following detailed description of the detailed preferred embodiment of the present invention, in conjunction with the appended drawings and claims.

DETAILED DESCRIPTION OF THE PREFERRED EMBODIMENT

The preferred embodiment herein described is not intended to limit the invention to the precise form disclosed, or to be mounted only to a van type vehicle. For the sake of clarity, internal supports and other features are not shown.

Figure 1:
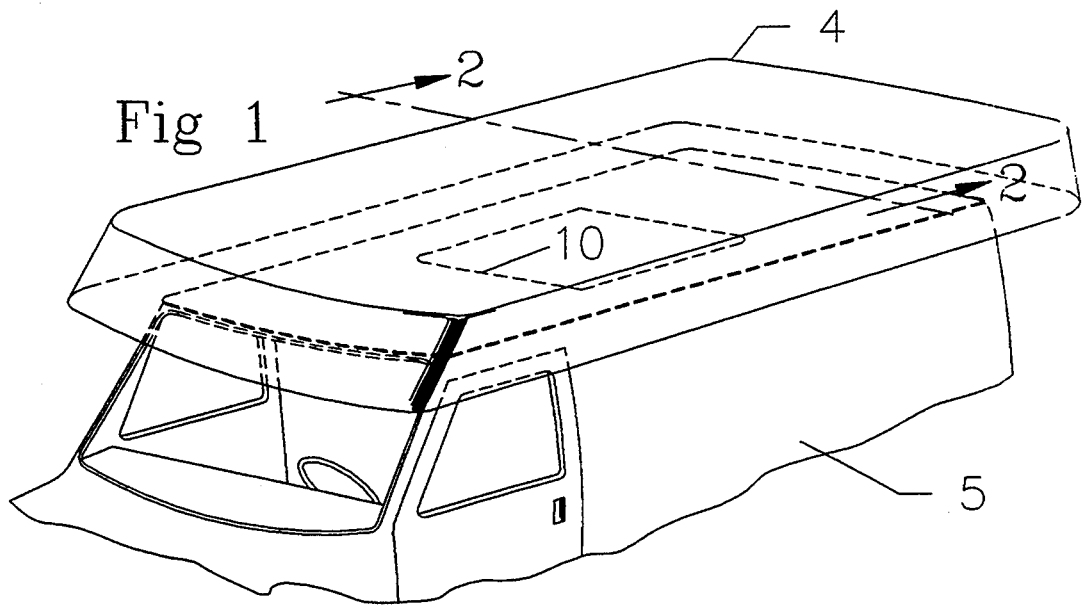
FIG. 1 is a perspective view of cap in accordance with the preferred embodiment of the present invention, shown connected to a van type vehicle.
Figure 2:
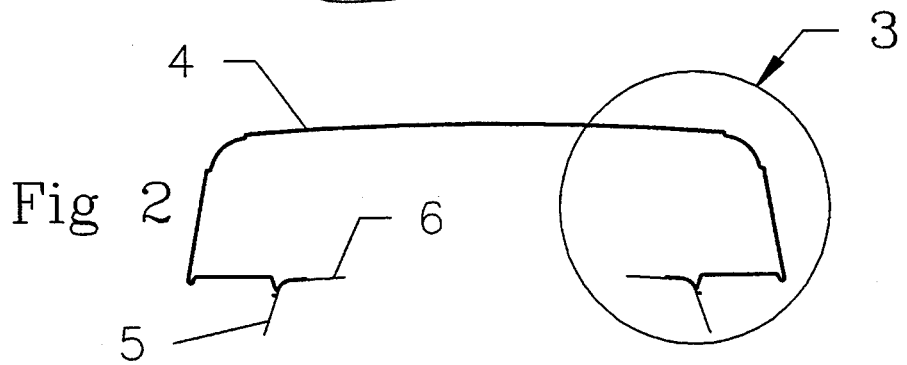
FIG. 2 is a fragmentary sectional view taken along line 2—2 of FIG. 1.

FIG. 1 shows the front side, rear side, and lateral sides 5, of the vehicle, and the vehicle roof 6. The front side refers to the windshield if the vehicle has one. The roof line is the intersection of all four vehicle sides 5, and the vehicle roof 6.

Figure 3:
FIG. 3 is an enlarged view of the encircled portion of FIG. 2.
Figure 3:
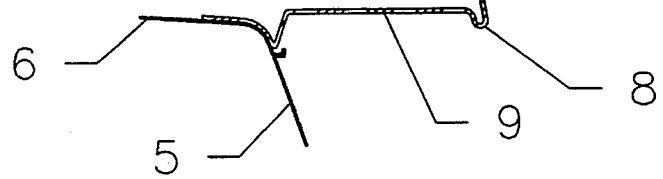

The cap 4 consists of a cap roof 11 and sides 7, a downward extending lip 8, and a partial floor 9. This configuration as illustrated in FIG. 3 continues around the periphery of the cap 4. The partial floor 9 of the cap extends onto the top 6 of the vehicle for a short distance allowing for support and attachment points.

The center of the partial floor 9 is open making a shell-like structure of the cap 4.

As shown in FIG. 1, the top 6 of the vehicle is partially removed 10 allowing access to the interior of the cap 4.

It is to be understood that the invention is not limited to the above-given details, but may be modified within the scope of the appended claim.

I claim:

1. A cap for attachment to the roof of a vehicle, the vehicle having an opening in the roof thereof, said cap comprising: a shell including a cap roof spaced from the vehicle roof with sides downwardly depending from the cap roof along the periphery thereof, said sides having partial floor portions attached along the lowermost edges thereof and said partial floor portions extending inwardly towards the vehicle and are attached to the vehicle at the vehicle roof line to form an enclosed compartment and the shell further including a downwardly extending lip at the intersection of the sides and the partial floor portions wherein the lip has a lowermost point that is lower than the partial floor portions, wherein said partial floor portions and downwardly extending lip overhangs the body of the vehicle on all sides thereof, whereby the lip directs rainwater away from the vehicle body and wherein the interior of the cap may be entered through the opening in the roof of the vehicle.

2. The cap of claim 1 wherein there is no outward overhang from the front side of said vehicle.

* * * * *